RASTER SIZE AND LINEARITY CONTROL FOR CATHODE RAY TUBES

Filed Nov. 18, 1957

INVENTORS
LOUIS E. HAIGH
IRVIN C. SUMMERS
BY
Robert D. Sanborn
ATTORNEY

United States Patent Office 2,931,932

Patented Apr. 5, 1960

2,931,932

RASTER SIZE AND LINEARITY CONTROL FOR CATHODE RAY TUBES

Louis E. Haigh, Langhorne, Pa., and Irvin C. Summers, Blackwood, N.J., assignors to Philco Corporation, Philadelphia, Pa., a corporation of Pennsylvania Application November 18, 1957, Serial No. 696,978

10 Claims. (Cl. 313—76)

The present invention relates to cathode ray tube deflection systems and more particularly to novel means for controlling the size and linearity of rasters produced on such cathode ray tubes.

In television systems a raster is formed on the screen of a cathode ray tube by deflecting the electron beam in a horizontal plane at a frequency of approximately 15 kilocycles per second and simultaneously deflecting the beam in a vertical plane at a frequency of approximately 60 cycles per second. Sawtooth horizontal and vertical deflection signals are employed so that the beam moves across the screen at a uniform rate and then quickly returns to its starting point for the next trace. In practice however it is difficult to generate a signal which will give a uniform rate of movement of the spot across the face of the screen. Therefore parts of the raster are either stretched or compressed depending on whether the beam speeds up or slows down its passage across the screen. This results in objectionable distortion of the image formed on the screen of the cathode ray tube. In the past it has been practice to correct such nonlinearities in magnetically deflected systems by means of suitable networks of resistors, capacitors and inductances in the circuits which generate the sweep signal. Such networks add an undesirable item of expense in the manufacture of television systems.

In television systems it is also necessary to control the width and height of the raster in order that the picture will exactly fit the viewing area of the cathode ray tube screen. Again this has been accomplished in the prior art by adding components in the circuits which are employed to generate the sweep. In general width control circuits of the prior art require either a variable inductor or a potentiometer, both of which are expensive.

Therefore it is an object of the present invention to provide novel means for controlling one or more dimensions of the raster on the screen of a cathode ray tube which does not add components to the circuits or deflection yoke assembly.

A further object of the present invention is to provide novel means for correcting for nonlinearities in the deflection of a cathode ray beam.

A further object of the invention invention is to provide a novel deflection assembly in which horizontal width and linearity and vertical width and linearity may be controlled by simple mechanical adjustments.

Still another object of the invention is to provide a simple novel method of selectively controlling horizontal width and linearity and vertical width and linearity by two simple mechanical adjustments.

These and other objects of the invention are achieved by providing a novel deflection yoke assembly which includes a segmented yoke core and clamping assembly. The novel assembly permits selective adjustments of the length of at least one air gap in the yoke core and further adjustment of the position of this gap relative to the planes of the horizontal and vertical deflection fields.

For a better understanding of the present invention together with other and further objects thereof reference should now be made to the following detailed description which is to be read in conjunction with the accompanying drawings in which.

Figure 1:
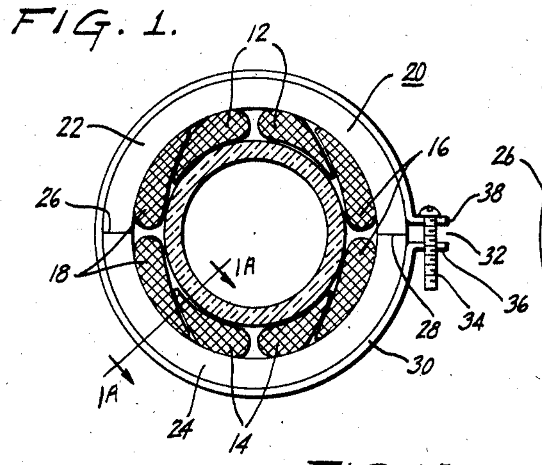
Fig. 1 is a cross-sectional view of the yoke core and clamping assembly of the present invention in one condition of adjustment.

In Fig. 1 the transverse cross-section of the neck of the cathode ray tube is shown at 10. Surrounding neck 10 are four saddle-shaped deflection coils 12, 14, 16 and 18. Coils 12 and 14 comprise the horizontal deflection coils and coils 16 and 18 comprise the vertical deflection coils. Surrounding deflection coils 12, 14, 16 and 18 is a magnetic core 20 which may be formed of two or more segments. In Fig. 1 two segments 22 and 24 are shown. These segments are separated by gaps 26 and 28 which may be of very small dimension so that for all practical purposes segment 22 abuts segment 24. Preferably core 20 is made of a ceramic magnetic material which has low eddy current losses. Surrounding core 20 is a metallic band member 30. Band 30 may be of magnetic or nonmagnetic material as desired. Band 30 is provided with a gap at 32 which is in alignment with one of the gaps in core 20, in this case gap 28. Means are provided at gap 32 in band 30 for adjusting the peripheral length of this band. In Fig. 1 this adjusting means is shown schematically as a screw 34 which is threaded into outwardly turned flange portion 36 of band 30 and which rotates freely in outwardly turned flange portion 38 of the same band 30. As will be explained in more detail presently, band 30 may be formed so that it normally tends to increase in diameter as clamping means 34 is loosened. Alternatively, means may be provided for urging band 30 and associated core segments 22 and 24 in an outward direction as clamping means 34 is loosened. Preferably the construction of the clamping means 34 is such that it does not provide a low reluctance path across gap 28.

Figure 2:
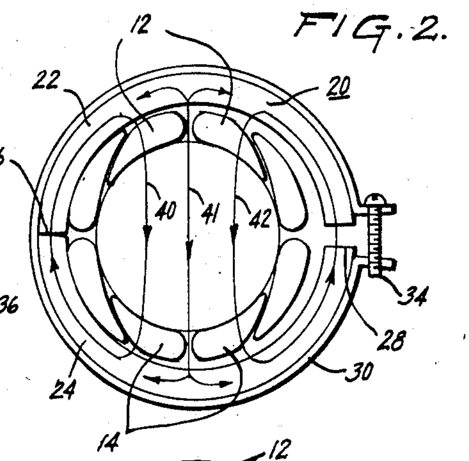
Fig. 2 is a cross-sectional view similar to Fig. 1 showing the yoke core and clamping assembly in a second position of adjustment which may be employed to adjust the width and linearity of a deflection pattern.
Figure 1A:
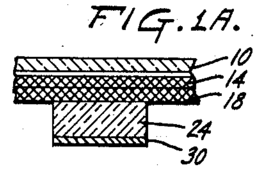

Fig. 1A is a fragmentary cross-sectional view taken along lines AA in Fig. 1 and showing band member 30, core segment 24, portions of winding 14 and 18 and the tube neck 10. Core segment 24 and band 30 are shown as having rectangular cross-sections but the invention is not to be limited by this showing, since other cross-sections, such as cross-sections which conform to the necessary shape of the deflection coils, will operate equally well. Fig. 2 is a view of the embodiment shown in Fig. 1 with a clamping means loosened to permit band member 30 to expand. In the embodiment of Figs. 1 and 2 core segments 22 and 24 are preferably secured to band 30 such as by cementing in order that members 22 and 24 will be moved outwardly by the expansion of band 30. The outward movement of segments 22 and 24 will cause the size of gap 28 to increase. The size of gap 26 will also increase but by a substantially lesser amount. The size of gap 28 and the spacing between core 20 and coils 12, 14, 16 and 18 have been greatly exaggerated in Fig. 2.

Lines 40, 41 and 42 in Fig. 2 represent the magnetic flux lines set up by the horizontal deflection coils 12 and 14. An electron beam passing through the yoke assembly of Fig. 2 would be deflected in a horizontal plane by the portions of the flux represented by lines 40, 41 and 42 which passes through the neck region 10 of the cathode ray tube. Neck 10 is not shown in Fig. 2 in order to simplify the drawing. The return path for the flux represented by lines 40, 41 and 42 is through the low reluctance core segments 22 and 24.

It is well known that the strength of the magnetic field may be controlled by varying the reluctance at any point in the path traversed by the magnetic lines. Therefore varying the air gap 28 will vary the total flux passing through the neck of tube 10 and will produce a decrease in the deflection of the electron beam resulting from this flux. It is also obvious from Fig. 2 that the reluctance for flux following path 42 is increased by a greater amount than the reluctance for flux following path 40, for example, since the size of gap 28 has been increased more than the size of gap 26. As a result the magnetic field in a region occupied by lines 42 will decrease relative to the flux in a region occupied by line 40. The effect of this change in the flux distribution across the neck 10 of the cathode ray tube will be described in greater detail in connection with the description of Figs. 5 and 6. It should be noted however that, in the position shown, gap 28 will have little or no effect on the flux set up by coils 16 and 18 since it does not lie across any of the paths followed by this flux. Since the outline of the deflection coils is generally circular and segments 22 and 24 form a generally circular ring, core 20 and clamping band 30 may be rotated together about the axis of tube 10 thereby to vary the position of gap 28 with respect to the planes of the horizontal and vertical deflection fields. Thus gap 28 may be positioned so that it affects only the horizontal deflection field, only the vertical deflection field, or both fields at once. It also lies within the scope of the present invention to provide a second clamping means in the vicinity of gap 26 so that the sizes of gaps 26 and 28 may be varied independently of one another.

Figure 3:
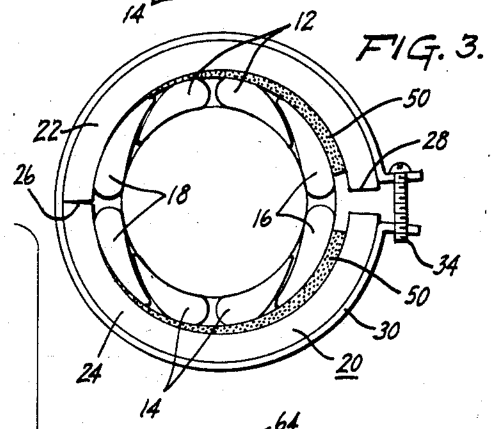
Fig. 3 is a modified form of the invention shown in Fig. 1.

Fig. 3 is a modification of the embodiment of the invention shown in Fig. 1. Parts in Fig. 3 corresponding to similar parts in Fig. 1 have been identified by the same reference numerals. In the embodiment of Fig. 3 a resilient material 50 is provided between the deflection coils 12, 14 and 16 and the core segments 22 and 24. This resilient material serves to urge core segments 22 and 24 against band 30 and also to urge band 30 in an outwardly direction through pressure exerted by segments 22 and 24. This resilient material may extend entirely around the circle formed by core 20 or it may be concentrated in the region of gap 28 as shown in Fig. 3. Including the resilient material as shown makes it unnecessary to secure core segments 22 and 24 to band 30. However it may be desirable to provide a flexible hinge bridging gap 26 in order to maintain gap 26 at substantially constant width as the length of band 30 is adjusted. This flexible hinge may be provided by a flexible adhesive in gap 26 or by a piece of adhesive tape lying just under band 30 and fastened to segments 22 and 24.

Figure 4:
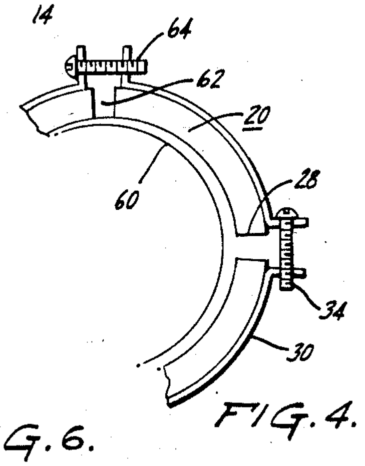
Fig. 4 is a fragmentary view showing modification which may be made in the embodiments of Fig. 1 or Fig. 3.

Fig. 4 is a fragmentary view showing a second modification which may be made in either the embodiment of Fig. 1 or the embodiment of Fig. 3. In Fig. 4 line 60 represents the outline of the deflection coils. These coils are not shown in detail in order to simplify the drawing. Gap 28, clamping member 34, core 20 and band 30 correspond to the similarly numbered elements in Figs. 1 through 3. In Fig. 4 core 20 is provided with a gap 62 approximately one-quarter of the way around the circumference from gap 28. A second clamping means 64 is provided for adjusting the size of gap 62. Gap 62 may be provided in place of or in addition to the gap 26 which is not shown in Figure 4. Varying the size of gap 62 will have very little effect on the horizontal deflection field but will have a substantial effect on the vertical deflection field. Similarly gap 28 will have a relatively large effect on the horizontal deflection field but substantially no effect on the vertical deflection field. Clamping means 64 and 34 therefore provide independent control of horizontal and vertical linearity respectively.

Figures 5A and 6A together illustrate that if gaps 26 and 28 between core members 22 and 24 are very small, a change in horizontal deflection current produces a linear change in horizontal spot position across the face of the cathode ray tube. It also illustrates that a relatively large deflection of this spot is obtained for a given deflection current.

Figures 5B and 6B illustrate that if gaps 26 and 28 are increased in length but still remain equal to one another there will still be a linear relationship between horizontal spot position and horizontal deflection current. However the amount of deflection for a given current is reduced. Therefore varying the size of gaps 26 and 28 by equal amounts provides width control without linearity control. As mentioned previously it lies within the scope of the present invention to provide suitable clamping means in the vicinity of gap 26 so that gaps 26 and 28 may be varied independently of one another. However since it is generally necessary to correct both for linearity and width it has been found that, in practice, one of these clamping means can be omitted and that all necessary control can be achieved by the single clamping means shown in Figures 1 through 3.

Figures 5C and 6C illustrate that, by varying only the width of gap 28, the amplitude of the deflection is reduced and the sweep at the extreme end of the scan is compressed. In a conventional television raster this would be the portion of the screen at the right of the picture. This compression is represented by the generally downward turning shape of curve 70 in Figure 6C. If core member 20 is rotated so that gap 28 now lies at the diametrically opposite position of neck 10 the sweep will reach substantially the same amplitude as in Figure 6C but the portion of the trace at the left of the picture will be compressed as indicated by the generally up-turning shape of curves 72 in Figure 6D.

Figures 5, 6:
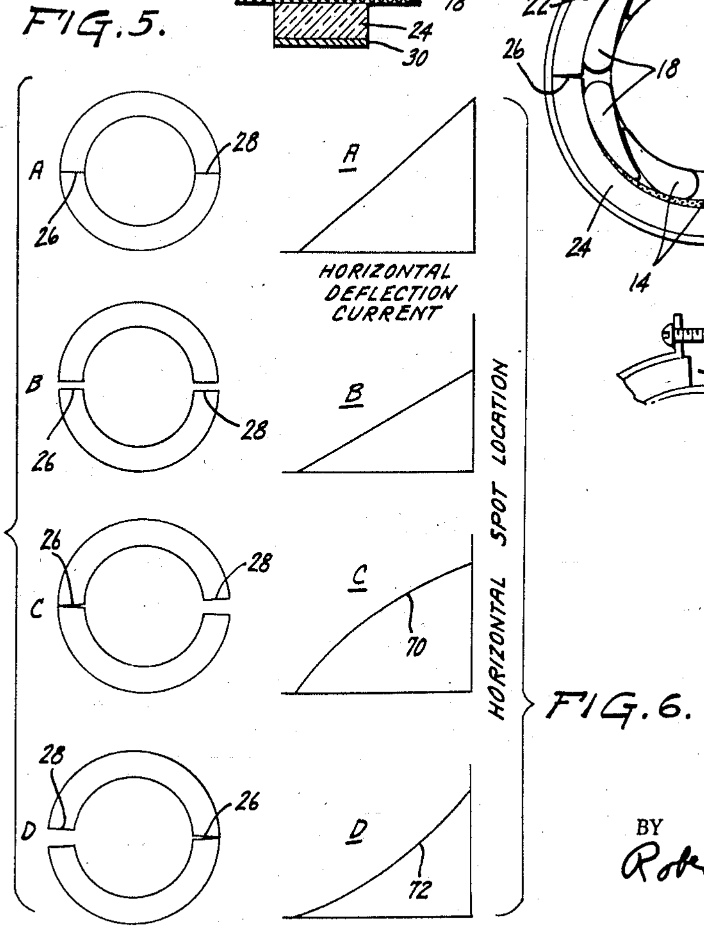
Fig. 5 is a schematic drawing representing four possible core gap configurations which may be obtained in deflection yoke assemblies constructed in accordance with the present invention.
Fig. 6 is a series of curves showing the effect of the gap configurations on Fig. 5 on the position of the electron beam of a cathode ray tube operatively associated with the deflection yoke assembly.

In the above description of Figures 5 and 6 reference has been made only to the horizontal field. It should be obvious that if gap 28 is moved 90° from the position shown in Figures 1 through 3 its effect on the horizontal field will be negligible but the effect on the vertical field will be substantially as shown in Figure 6A through D. A position of gap 28 intermediate the horizontal or vertical positions mentioned will cause this gap to affect both the horizontal and vertical fields. Therefore, by proper choice of the position and size and width of gap 28, horizontal linearity, vertical linearity, horizontal width and vertical heighth may be controlled.

The novel control means of the present invention is adjusted by rotating the core 20 and adjusting clamping means 34 while observing the image on the screen of the cathode ray tube until the desired size and linearity of the image is achieved. Since usually only very slight adjustments of the size of gap 28 are required to compensate for variations within manufacturing tolerances, the friction between core 20 and the deflection coils, or any protective coating for these coils (not shown), may be made sufficient to maintain core 20 in its adjusted position.

The operation of the embodiment shown in Figure 4 should be obvious from the previous discussion. The gaps 62 and 28 in core 20 are positioned and adjusted in length so as to produce the necessary correction in width and linearity for the horizontal and vertical deflection fields. It is to be understood that it is usually necessary to form core 20 of two or more segments in order that it may be fitted around the saddle-shaped deflection coils 12, 14, 16 and 18. It is usually necessary to provide a clamping band to retain these segments in position. Therefore the only additional elements required by the present invention is the means for maintaining the core segments in engagement with band 30. As illustrated above, this means may be provided very inexpensively.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

We claim:

1. For use with a cathode ray tube deflection yoke assembly which includes at least one pair of deflection coils, a ring-like core of magnetic material adapted to surround said deflection coils, said ring-like core being formed of two segments, one pair of abutting ends of said segments being hinged together and means associated with said two segments for varying the spacing between the other pair of abutting ends.

2. A deflection yoke assembly for a cathode ray tube, said deflection yoke assembly comprising a pair of horizontal deflection coils and a pair of vertical deflection coils disposed about an axis, a ring-like core of magnetic material surrounding said deflection coils in a plane transverse to said axis, said core being formed of at least two segments, a clamping band surrounding said core, said clamping band being formed with a gap therein at a point corresponding to the juxtaposed ends of two of said segments, non-magnetic adjustable clamping means cooperating with the ends of said clamping band to vary the length of said gap therein and means for maintaining said core segments in peripheral contact with said clamping band.

3. A deflection yoke assembly as in claim 2 wherein said core segments are mechanically fastened to said clamping band.

4. A deflection yoke assembly for a cathode ray tube, said assembly comprising a pair of horizontal deflection coils and a pair of vertical deflection coils disposed about an axis, a ring-like core of magnetic material surrounding said deflection coils in a plane transverse to said axis, said ring-like core being formed of at least two annular segments separated by first and second spaced air gaps, and adjusting means associated with said two annular segments for varying the position of said annular segments in a direction to vary the length of said air gaps, said adjusting means limiting the variation in length of said first air gap to an amount substantially less than the variation in the length of said second air gap.

5. A deflection yoke assembly for a cathode ray tube, said assembly comprising a pair of horizontal deflection coils and a pair of vertical deflection coils disposed about an axis, a ring-like core of magnetic material surrounding said deflection coils in a plane transverse to said axis, said ring-like core being formed of at least two annular segments separated by first and second spaced air gaps, resilient mechanical biasing means disposed between said deflection coils and said ring-like core for urging said segments outwardly away from said deflection coils, said resilient mechanical biasing means being concentrated in the region of said second air gap, and an adjustable clamping hand surrounding said ring-like core for restraining the outward movement of said segments, the portion of said clamping band bridging said second air gap being formed of non-magnetic material.

6. A deflection yoke assembly for a cathode ray tube, said assembly comprising a pair of horizontal deflection coils and a pair of vertical deflection coils disposed about an axis, a ring-like core of magnetic material surrounding said deflection coils in a plane transverse to said axis, said ring-like core being formed of at least two annular segments separated by first and second spaced air gaps, flexible hinge means joining the annular segments bordering said first air gap, and adjusting means associated with said two annular segments for varying the position of said annular segments in a direction to vary the length of said air gaps, said flexible hinge means limiting the variation in length of said first air gap to an amount substantially less than the variation in length of said second air gap.

7. A deflection yoke assembly in accordance with claim 6 wherein said adjusting means associated with said two annular segments comprises an adjustable, magnetizable, clamping band surrounding said ring-like core, said clamping band terminating in spaced apart ends which define a gap therein coinciding with said second air gap, and an adjusting means cooperating with said spaced apart ends of said clamping band to vary the effective length thereof thereby to vary the length of said air gaps, the portion of said adjusting means bridging said gap in said clamping band being formed of non-magnetic material.

8. A deflection yoke assembly for a cathode ray tube, said deflection yoke assembly comprising a pair of horizontal deflection coils and a pair of vertical deflection coils disposed about an axis, a ring-like core of magnetic material surrounding said deflection coils in a plane transverse to said axis, said core being formed of at least two annular segments separated by first and second spaced air gaps, a substantially non-extensible clamping band surrounding said core, said annular segments being mechanically fastened to said clamping band so as to maintain a fixed position relative to said band, said clamping band terminating in two spaced ends which define a gap therein at a point corresponding to said second air gap and an adjustable clamping means cooperating with said spaced ends of said clamping band to vary the length of said gap therein, the portion of said adjustable clamping means bridging said gap in said clamping band being formed of non-magnetic material.

9. A deflection yoke assembly in accordance with claim 8 wherein said clamping band is formed with third and fourth spaced ends defining a second gap in said clamping band at a point corresponding to said first air gap and second adjustable clamping means cooperating with said third and fourth spaced ends to vary the length of said second gap in said clamping band.

10. A deflection yoke assembly in accordance with claim 8 wherein said first and second spaced air gaps are aligned with the magnetic field set up by one of said pairs of deflection coils.

References Cited in the file of this patent

UNITED STATES PATENTS

| | | |
|---|---|---|
| 2,692,355 | Sickles et al. | Oct. 19, 1954 |
| 2,704,816 | Fernsler | Mar. 22, 1955 |
| 2,719,252 | Margolis | Sept. 27, 1955 |
| 2,821,671 | Kratz et al. | Jan. 28, 1958 |
| 2,824,267 | Barkow | Feb. 18, 1958 |

FOREIGN PATENTS

| | | |
|---|---|---|
| 476,947 | Great Britain | Dec. 20, 1937 |
| 885,948 | France | June 15, 1943 |
| 1,123,925 | France | June 18, 1956 |